G. A. TINNERMAN.
COMBINED GAS AND SOLID FUEL RANGE.
APPLICATION FILED APR. 7, 1913.

1,217,531. Patented Feb. 27, 1917.
3 SHEETS—SHEET 1.

Witnesses:

Inventor
George A. Tinnerman,
by
Attorney

G. A. TINNERMAN.
COMBINED GAS AND SOLID FUEL RANGE.
APPLICATION FILED APR. 7, 1913.
1,217,531.
Patented Feb. 27, 1917.
3 SHEETS—SHEET 2.
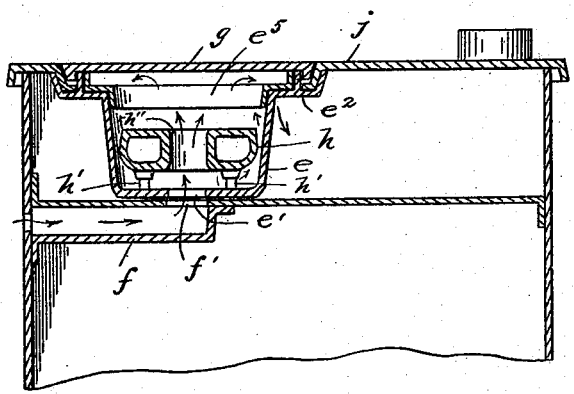
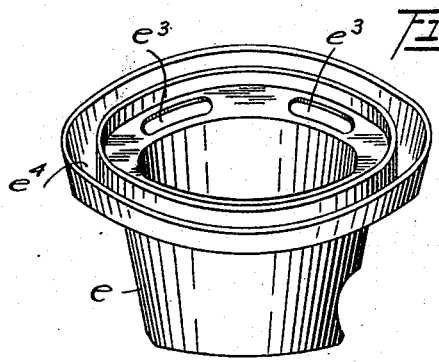
Fig. 3.
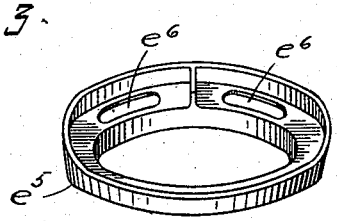
Fig. 5.
Fig. 4.
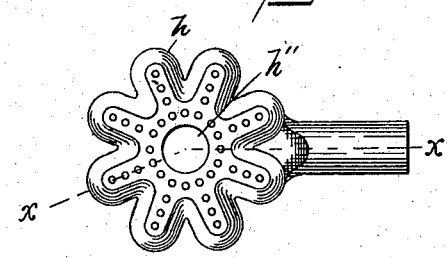
Fig. 6.
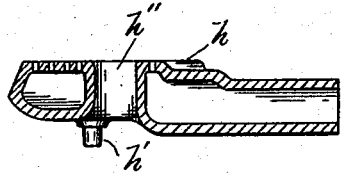
Fig. 7.
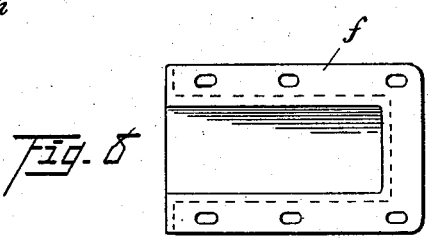
Fig. 8.
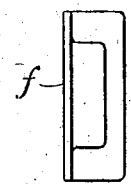
Fig. 9.
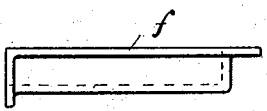
Fig. 10.
Witnesses:
Inventor
George A. Tinnerman
by
Attorney G. A. TINNERMAN.
COMBINED GAS AND SOLID FUEL RANGE.
APPLICATION FILED APR. 7, 1913.

1,217,531.

Patented Feb. 27, 1917.
3 SHEETS—SHEET 3.

Witnesses:

Inventor
George A. Tinnerman
By
Attorney

UNITED STATES PATENT OFFICE.

GEORGE A. TINNERMAN, OF CLEVELAND, OHIO.

COMBINED GAS AND SOLID-FUEL RANGE.

1,217,531. Specification of Letters Patent. Patented Feb. 27, 1917.

Application filed April 7, 1913. Serial No. 759,282.

*To all whom it may concern:*

Be it known that I, GEORGE A. TINNERMAN, a citizen of the United States of America, residing at Cleveland, in the county of Cuyahoga and State of Ohio, have invented certain new and useful Improvements in Combined Gas and Solid-Fuel Ranges, of which the following is a specification.

My invention relates to improvements in a combined gas and solid fuel range, and more particularly to the construction, arrangement and connection of the bowl-burners employed therein. The object of my invention is to provide a range of this type with burners which will interfere as little as possible with the use of solid fuel, while obtaining the maximum efficiency and utility for the gas-burning members.

In ranges of this type, the preferred arrangement involves the use of two bowl-burners, which are positioned at the front of the range, and are supplied with lateral connections for the access of gas and air to the burners. The individual bowls, of course, are required for the purpose of protecting the burners from the accumulation of soot and ashes, while avoiding the deflection of the gas flames by the draft, and necessarily obstruct the top flue of the range, while the air and gas connections ordinarily block the flue along the front of the range. Accordingly, I have provided an improved construction, wherein the bowl burners are individually provided with air ducts, situated beneath the top flue of the range, while the gas connections are inducted from the end of the range in a manner to obstruct the top flue thereof, as little as possible. Moreover, in ranges of this character, it is desirable that the gas burners may be used either with the ordinary stove lid in position, or with the open flame. Bearing these conditions also in mind, I have provided controllable vents in the bowls connecting with the top flue of the range, which are positioned peripherally of the bowl, in the top rim encircling the same, whereby the flame and products of combustion are spread for the purpose of insuring an even and efficient heating action. Finally, I have mounted the bowls and lids in a manner to avoid impairing the draft of the range. The details of my improved construction, may be readily explained, by referring to the accompanying drawings, wherein:—

Fig. 3, shows another vertical section taken at right angles to that of Fig. 2.

Figs. 4 and 5, respectively, show a bowl and its rotatable slide in perspective.

Figs. 6 and 7, respectively, are plan and sectional views on line $x$—$x$, of the star burner.

Figure 11:
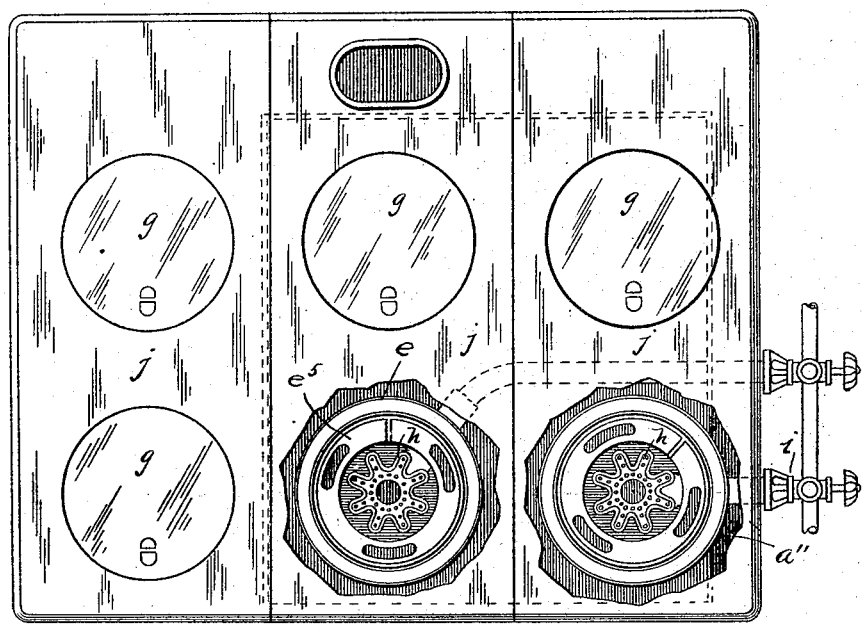
Figure 12:
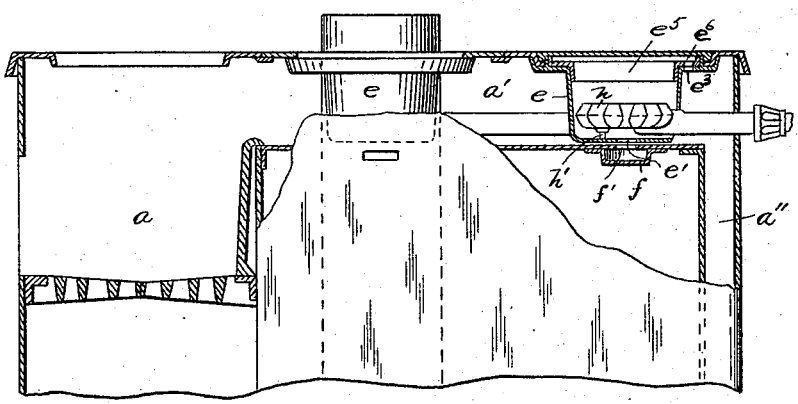

Figs. 8, 9 and 10, respectively, are top, end and side views of the individual box or air draft for the bowl burner, and Figs. 11 and 12, respectively, are top and vertical sectional views partially broken away, of a combined gas and solid fuel range of the down-draft type, embodying my improvements.

The same character of reference is employed throughout the several figures of the drawings to indicate similar parts.

Figure 1:
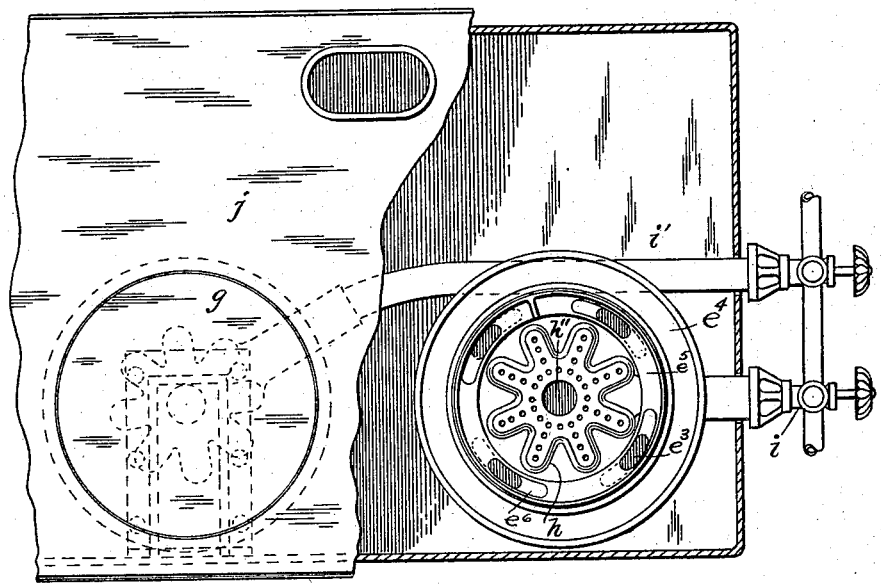
Figure 1, is a fragmentary view, partially broken away of a simple type of range embodying my improvement.
Figure 2:
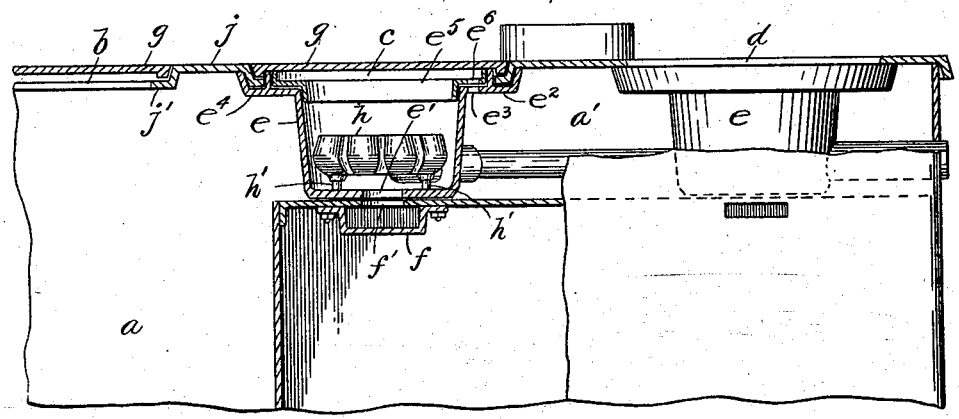
Fig. 2, is a similar view of the same, shown principally in vertical section.

My improvements, or certain portions thereof, may be applied to various styles of solid fuel ranges, as indicated in the accompanying drawings, although said improvements are primarily designed for use in connection with ranges having upper, down-draft and bottom flues surrounding the ovens thereof. Referring first to Fig. 1, there is shown a solid fuel range having two cooking holes, one or both of which may be removably equipped with my improved bowl burner. In Fig. 2, the third cooking hole with its lid, is fragmentally shown upon the right, immediately above the fire box $a$. These cooking holes may be designated in order, as $b$, $c$ and $d$. The bowls $e$ are of identical construction. Each is provided with a central bottom opening $e'$ registering with the boxed air-draft $f$, and its opening $f'$, disposed beneath the top flue $a'$. Each bowl is provided with a flanged rim $e^2$, having controllable vents $e^3$ peripherally positioned with respect to the body of the bowl, and an annular channel $e^4$, for accommodating the top section $j$ and lid $g$. A separate revoluble slide $e^5$ is positioned above the interior portion of the flange, and contains registering openings $e^6$, corresponding to those of the bowl. (See Figs. 4 and 5). By rotating the slide-member with respect to the bowl, it is apparent that the openings from the bowl into the top flue may be controlled or altogether closed, as desired.

Within each bowl, is provided a star-burner, connected either directly with the air mixer and gas valve $i$, or intermediately, by means of a slightly bent length of pipe $i''$. Said star burner $h$ preferably is spaced above the bottom of the bowl, by means of lugs $h'$, while the center of the burner is provided with an opening $h''$, substantially registering with the bottom opening $e'$, whereby the free circulation of air is insured about the burner.

Referring more particularly to Figs. 2 and 3, it will be seen that an adequate air supply is constantly assured for supporting combustion and effecting cooking, either with an open flame, or through the stove lid positioned upon the bowl. I have endeavored to indicate, by means of arrows, the direction or course taken by the air, before and after combustion. The controllable vents $e^3$, serve evenly to deflect the heated gases before their exit into the upper flue $a'$, and the same are readily regulated by means of the revoluble slide $e^5$. Thus the maximum heating effect for a given volume of gas consumed, may be individually regulated, with respect to each burner, and one may have a full gas and air-supply, while the other is restricted as to both.

It will further be observed, upon referring to Figs. 2 and 3, that the top section $j$ is provided with a substantially L-shaped annular flange $j'$ about the cooking holes, which fits closely within the exterior channeled rim $e^4$, and this construction, affording relatively wide engaging surfaces, as it does, serves to permit of a readily separable connection between the bowl and top section; while affording practically no leakage for the external air to reach the top flue.

The bowl burners shown in Figs. 11 and 12, are of substantially the same construction already described, but are of slightly smaller size to adapt them for more compact disposition in the down-draft range therein shown. Three relatively longer vents $e^3$ and registering openings $e^6$, are provided respectively in the top of the bowl and slide. These bowls are positioned in the top flue $a'$, communicating with the fire-box $a$ upon the left, and the down-draft flue $a''$ upon the right. Individual boxed air-drafts $f$, are also provided for the bowls, and burners. The range herein shown and described, permits of the independent use of gas and coal, or other solid fuel; the former commonly being used until the coal fire has started. The individual slides of the bowl burners may be regulated to avoid interfering with the draft through the fire box, as little as possible, while the avoidance of transverse connections and positioning of the bowls in alinement contribute to freeing the top flue from obstructions, as far as possible. The bowls themselves are constructed to avoid any deflecting lateral currents of air, so that the heating effect is as even and equal as possible, and the vents, being positioned peripherally of the body of the bowl, and preferably within the upper flanged rim thereof, are not interfered with when the burner is used for heating pots, as they are supported upon the upstanding rim adjacent to said vents.

Having now described the preferred embodiments of my invention, I claim as new and desire to secure by Letters Patent, the following:—

1. In a convertible range, the combination with an annularly flanged cooking hole thereof, of a bowl comprising an open bottom construction and a horizontally flanged rim provided with two upstanding annular ribs fitting beneath said flanged cooking hole, and a gas-burner positioned within said bowl, substantially as set forth.

2. In a convertible range, the combination with a cooking hole thereof, of a bowl insertible therein comprising a partially open bottom, flaring sides and a horizontal flange provided with annular vents adjacent to the top of said bowl, and a gas-burner positioned within the bowl, substantially as set forth.

3. The combination with a solid fuel range, having a grate at one end thereof, and a connecting upper flue, of a bowl positioned beneath one of the front cooking holes, and within said flue; said bowl having a bottom opening, and a peripheral flange provided with controllable vents connecting with the upper flue, an air-draft disposed beneath said upper flue and connecting with the bowl, a gas burner within said bowl, and a gas connection extending from the end of the range opposite the grate to said gas burner within the bowl, substantially as set forth.

4. The combination with a solid fuel range, of a bowl disposed beneath a cooking hole thereof; the same having a channeled rim and a horizontally flanged top provided with vents, an air-draft connecting with the bottom of the bowl, a gas burner within the bowl, and a gas supply pipe connected to the burner, substantially as set forth.

5. The combination with a solid fuel range, of a bowl having a bottom draft opening and upper vents annularly provided in a plane parallel with the bottom, positioned in a cooking hole thereof and extending within the top flue, an individual air-draft connected with the bottom of the bowl and positioned beneath said top flue, a gas burner within said bowl and a connection extending to the burner for supplying a mixture of gas and air thereto, substantially as set forth.

6. The combination with a solid fuel range, of convertible members positioned within the top flue thereof, each comprising a bowl removably positioned beneath a front cooking-hole of said range and provided with a horizontal annular flange having upper peripheral vents communicating with the flue of the range and a bottom draft-opening, a burner removably positioned within the bowl, a gas supply pipe extending to said burner, and an air draft positioned beneath the flue and connecting with the bottom opening in the bowl, substantially as set forth.

In testimony whereof I do now affix my seal and signature in the presence of two witnesses.

GEORGE A. TINNERMAN. [L. S.]

Witnesses:
A. H. TINNERMAN,
ALBERT LYNN LAWRENCE.

Copies of this patent may be obtained for five cents each, by addressing the "Commissioner of Patents, Washington, D. C."